(12) United States Patent
Winkler et al.

(10) Patent No.: US 12,516,932 B2
(45) Date of Patent: Jan. 6, 2026

(54) ROTARY LASER CORE

(71) Applicant: Milwaukee Electric Tool Corporation, Brookfield, WI (US)

(72) Inventors: John N. Winkler, Milwaukee, WI (US); David W. Draeger, Sussex, WI (US); Jacob D. Hadfield, Mukwonago, WI (US); Max D. Mutza, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 336 days.

(21) Appl. No.: 18/333,291

(22) Filed: Jun. 12, 2023

(65) Prior Publication Data

US 2023/0384094 A1 Nov. 30, 2023

Related U.S. Application Data

(63) Continuation of application No. PCT/US2023/023871, filed on May 30, 2023.

(60) Provisional application No. 63/347,360, filed on May 31, 2022.

(51) Int. Cl.
*G01C 15/00* (2006.01)
(52) U.S. Cl.
CPC .................. *G01C 15/006* (2013.01)
(58) Field of Classification Search
CPC ..... G01C 15/002; G01C 15/004; G01C 15/02
USPC ........................... 33/286, 290, 291
See application file for complete search history.

(56) References Cited

U.S. PATENT DOCUMENTS

| | | | | |
|---|---|---|---|---|
| 4,136,962 A | * | 1/1979 | Brouwer | G01C 15/004 356/148 |
| 5,485,266 A | * | 1/1996 | Hirano | G01B 11/26 33/291 |
| 5,606,802 A | * | 3/1997 | Ogawa | G01C 15/105 356/138 |
| 5,655,307 A | * | 8/1997 | Ogawa | G01C 15/002 33/290 |
| 5,900,931 A | * | 5/1999 | Rando | G01C 15/002 356/149 |
| 5,917,587 A | | 6/1999 | Rando | |
| 6,384,420 B1 | | 5/2002 | Doriguzzi Bozzo | |
| 6,915,583 B2 | | 7/2005 | El-Katcha et al. | |

(Continued)

FOREIGN PATENT DOCUMENTS

| | | |
|---|---|---|
| CN | 101685190 | 8/2011 |
| CN | 202024761 | 11/2011 |

(Continued)

OTHER PUBLICATIONS

International Search Report and Written Opinion for International Application No. PCT/US2023/023871 dated Sep. 19, 2023, 9 pages.

*Primary Examiner* — George B Bennett
(74) *Attorney, Agent, or Firm* — Reinhart Boerner Van Deuren s.c.

(57) ABSTRACT

Various laser level designs including an improved core structure are shown. In one example, the laser level includes housing, a core structure, and a laser generator positioned within the cores structure and/or the housing. The core structure further includes a plurality of leveling pins allowing for leveling in one or more directions and one or more pin retainers coupled to and extending between the leveling pins.

20 Claims, 8 Drawing Sheets

(56) References Cited

U.S. PATENT DOCUMENTS

| | | | |
|---|---|---|---|
| 7,013,571 B2 | 3/2006 | El-Katcha et al. | |
| 7,266,898 B2 | 9/2007 | El-Katcha et al. | |
| 7,296,360 B2 | 11/2007 | El-Katcha et al. | |
| 7,373,724 B2* | 5/2008 | Qi | G01C 15/002 33/291 |
| 7,520,064 B2* | 4/2009 | Hayase | G01C 15/004 33/290 |
| 7,536,796 B2* | 5/2009 | Tamamura | G01C 15/02 33/291 |
| 7,571,546 B1* | 8/2009 | Sergyeyenko | G01C 15/02 33/291 |
| 7,637,022 B2* | 12/2009 | Hayes | G01C 15/105 33/291 |
| 9,702,739 B2 | 7/2017 | Lukie et al. | |
| 10,352,737 B2 | 7/2019 | Lukie et al. | |
| 10,634,791 B2* | 4/2020 | Komeichi | G01S 17/89 |
| 10,753,739 B2 | 8/2020 | Terashima et al. | |
| 10,982,958 B2* | 4/2021 | Lombardi | G01C 15/002 |
| 11,105,901 B2* | 8/2021 | Takahashi | G01S 7/4817 |
| 2005/0198845 A1* | 9/2005 | Robinson | G01C 15/004 33/227 |
| 2005/0278966 A1* | 12/2005 | Liu | G01C 15/004 33/286 |
| 2013/0000133 A1* | 1/2013 | Kodaira | G01C 15/008 33/227 |
| 2016/0153774 A1* | 6/2016 | Kodaira | G01C 15/002 356/614 |
| 2020/0300626 A1 | 9/2020 | Mizuno | |
| 2021/0223044 A1* | 7/2021 | Chen | G01C 15/006 |
| 2023/0115417 A1* | 4/2023 | Caelwaerts | G01C 15/004 310/48 |

FOREIGN PATENT DOCUMENTS

| | | |
|---|---|---|
| CN | 101685191 | 6/2013 |
| CN | 106123876 | 11/2016 |
| CN | 207853159 | 9/2018 |
| CN | 211178472 | 8/2020 |
| CN | 112880655 | 6/2021 |
| CN | 213397106 | 6/2021 |
| CN | 213600092 | 7/2021 |
| CN | 214308801 | 9/2021 |
| CN | 113639708 | 11/2021 |
| CN | 214839670 | 11/2021 |
| CN | 215000713 | 12/2021 |
| CN | 215177746 | 12/2021 |
| CN | 215373969 | 12/2021 |
| DE | 202014008041 | 12/2014 |
| JP | 07248228 | 9/1995 |
| KR | 1020010110067 | 12/2001 |

\* cited by examiner

ROTARY LASER CORE

CROSS-REFERENCE TO RELATED PATENT APPLICATION

The present application is a continuation of International Application No. PCT/US2023/023871, filed May 30, 2023, which claims the benefit of and priority to U.S. Provisional Application No. 63/347,360 filed on May 31, 2022, which are incorporated herein by reference in their entireties.

BACKGROUND OF THE INVENTION

The present invention relates generally to the field of tools. The present invention relates specifically to a laser level, such as a rotary laser level with a core with increased durability.

SUMMARY OF THE INVENTION

One embodiment of the invention relates to a laser level including a housing, a core structure positioned within the housing, and a laser generator positioned within the core structure and configured to emit a laser. The laser level further includes a set of leveling pins coupled to the core structure and configured to level the laser generator in a first direction. The set of leveling pins includes a first core retaining pin, a second core retaining pin, a biasing component retaining pin and a motor leveling pin positioned between the first core retaining pin and the second core retaining pin. Further, the laser level includes a biasing component coupled to and extending between the biasing component retaining pin and the second core retaining pin, a first pin retainer, and a second pin retainer. The first pin retainer is coupled to and extends between the biasing component retaining pin and the motor leveling pin. The second pin retainer is coupled to and extends between the first core retaining pin and the second core retaining pin.

Another embodiment of the invention relates to a laser generating device including a housing, a core structure positioned within the housing, and a laser generator positioned within the core structure and configured to emit a laser. The laser generating device further includes a set of leveling pins coupled to the core structure and configured to level the laser generator. The set of leveling pins includes a first core retaining pin, a second core retaining pin, a biasing component retaining pin and a motor leveling pin positioned between the first core retaining pin and the second core retaining pin. Further, the laser generating device includes a pin retainer coupled to and extending between the biasing component retaining pin and the motor leveling pin. When an impact force is applied to the core structure, the pin retainer spreads the impact force between the biasing component retaining pin and the motor leveling pin.

Another embodiment of the invention relates to a laser level including a housing, a core structure positioned within the housing, and a laser generator positioned within the core structure and configured to emit a laser. The laser level further includes a set of leveling pins coupled to the core structure and configured to level the laser generator. The set of leveling pins includes a first core retaining pin extending from the core structure in a first direction, a second core retaining pin extending from the core structure in a generally parallel orientation to the first core retaining pin, a biasing component retaining pin extending from the core structure in a second direction, and a motor leveling pin extending from the core structure in a generally parallel orientation to the biasing component retaining pin and positioned between the first core retaining pin and the second core retaining pin. Further, the laser level includes a biasing component coupled to the biasing component retaining pin and the second core retaining pin, a first pin retainer, and a second pin retainer. The first pin retainer is coupled to and extends between the biasing component retaining pin and the motor leveling pin. The second pin retainer is coupled to and extends between the first core retaining pin and the second core retaining pin. The first pin retainer distributes a force on the core structure between the biasing component retaining pin and the motor leveling pin. The second pin retainer distributes the force on the core structure between the first core retaining pin and the second core retaining pin.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a laser level, such as a rotary laser level are shown. The laser level discussed herein includes an improved core structure designed to increase durability of the laser level. For example, in some conventional laser levels, when the laser level undergoes an impact (e.g., drop of rotary laser level 10, impact from falling tool or other worksite debris, etc.) damage to the core structure and specifically the leveling pins can occur. Applicant believes the designs discussed herein, for example by including pin retainers coupled to the leveling pins and/or providing leveling pins with the specific dimensions discussed herein can reduce the amount of force applied (i.e., distribute the load) to the core and/or leveling pins during an impact and increase the durability of the core (i.e., improve maintenance of accuracy after impact). Applicant believes damage to the core and specifically the leveling pins such as bending and/or breaking damage can be reduced using the core structure discussed herein.

Figure 1:
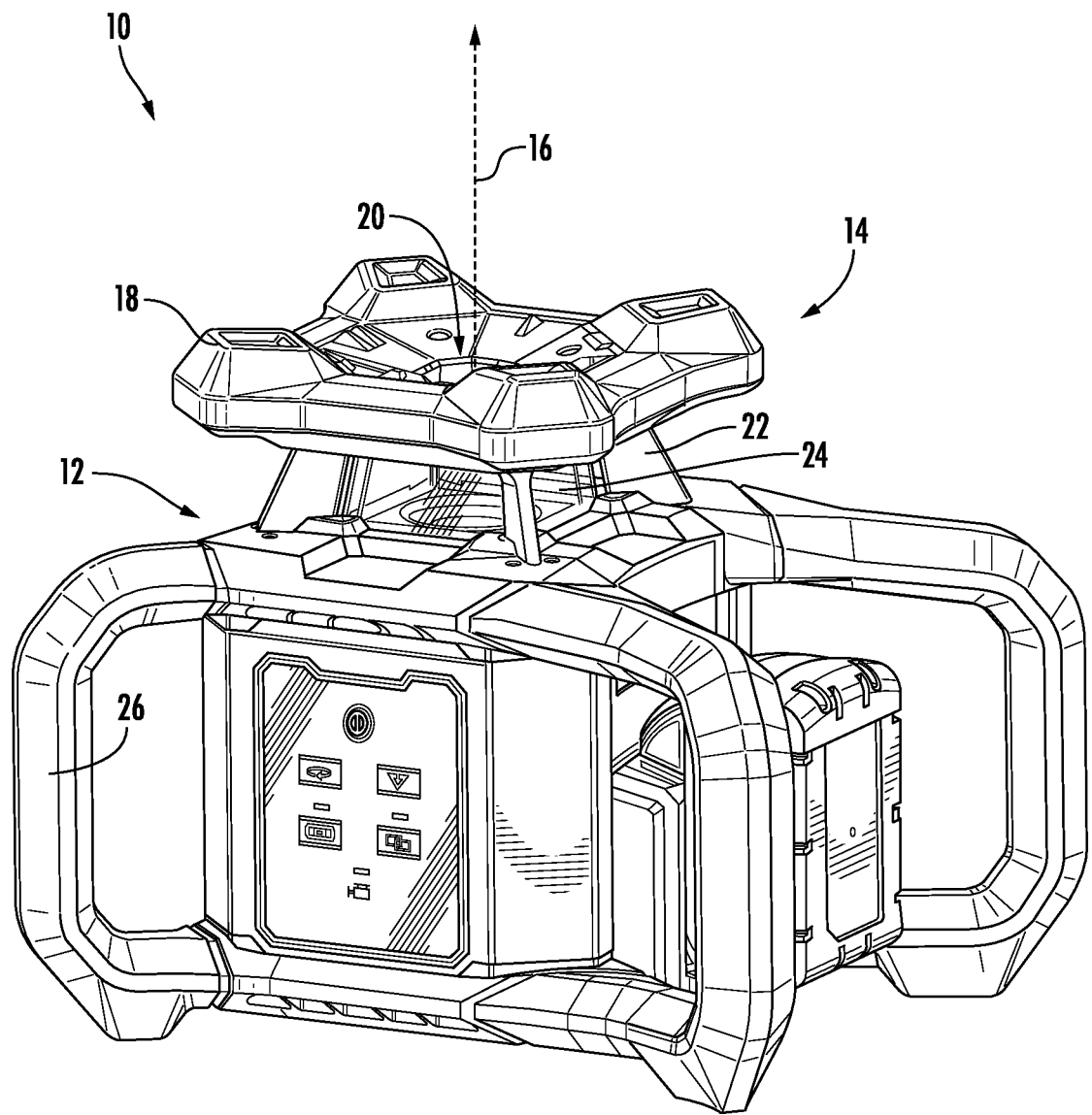
FIG. 1 is a perspective view of a laser level, according to an exemplary embodiment.
Figure 2:
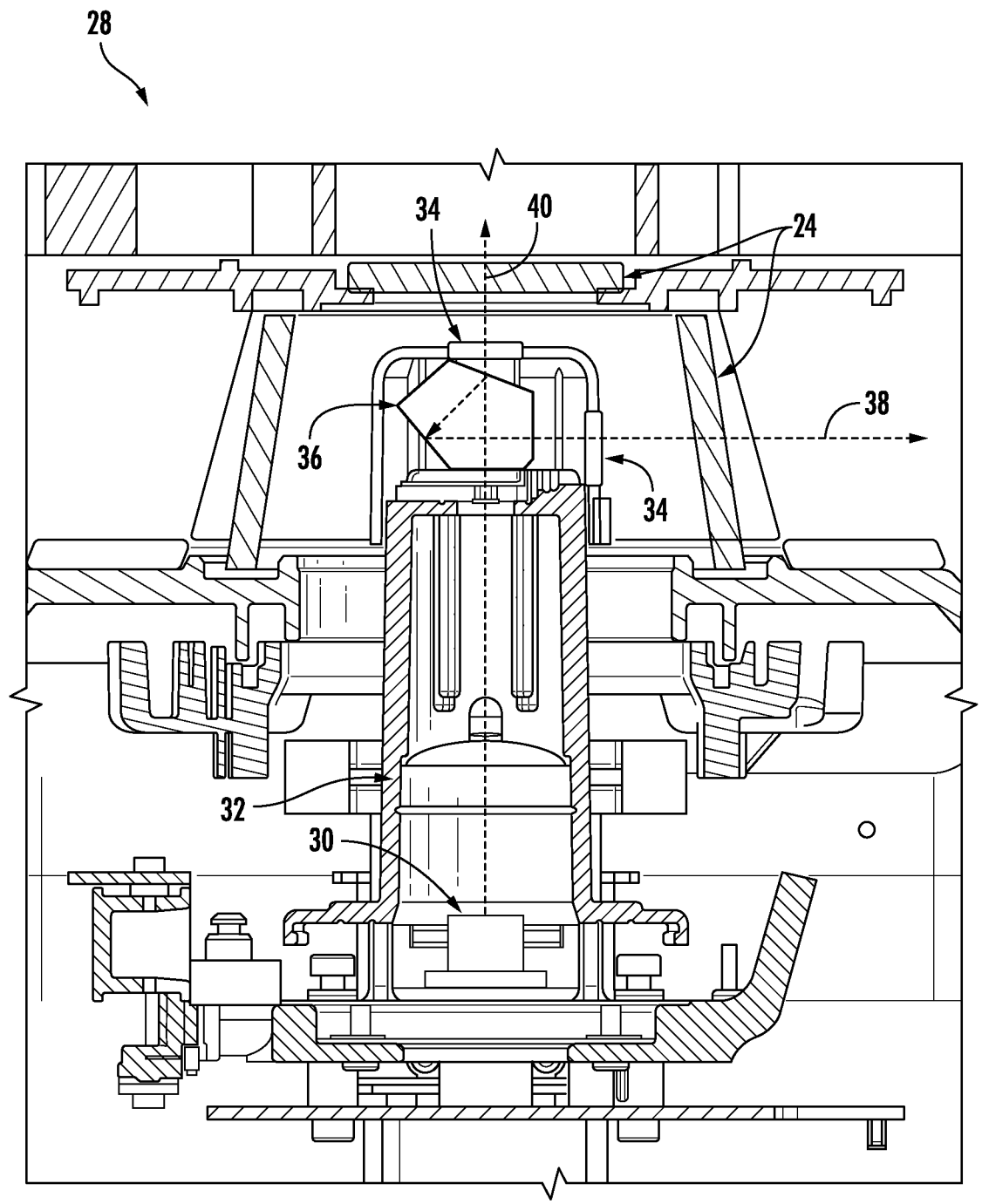
FIG. 2 is a cross-sectional view of the laser generating and projecting components of the laser level of FIG. 1, according to an exemplary embodiment.

Referring to FIGS. 1-2, various aspects of a laser level, shown as a rotary laser level 10, are shown. Rotary laser level 10 includes a housing 12, a cage 14, and a laser generator 28 positioned within housing 12 and/or within cage 14. Cage 14 includes a bumper 18 with a central aperture 20 and plurality of legs 22 that define a plurality of openings and/or side windows 24. In a specific embodiment, rotary laser level 10 includes a plurality of handles 26 coupled to housing 12 allowing for increased stability and movement of rotary laser level 10. In general, laser generator 28 includes various components for generating the laser plane associated with laser level 10. Laser generator 28 includes a laser emitting device, shown as laser diode 30, and various optical components (e.g., lens, collimators, mirrors, beam shapers, etc.) shown as focusing lens 32, wedge lens 34, a pentaprism 36 and supporting hardware (e.g., leveling pendulum, position sensors, electronic controllers, etc.).

Pentaprism 36 spins about a vertical axis, shown as central axis 16, in a clockwise and/or counterclockwise direction. As pentaprism 36 spins, a horizontal laser beam 38 is projected through a wedge lens 32 and side windows 24 in a generally horizontal direction out of cage 14. A plumb laser beam 40 is projected through pentaprism 36 through a wedge lens 34 and a top window 39 in a generally vertical direction out of cage 14.

Figure 3:
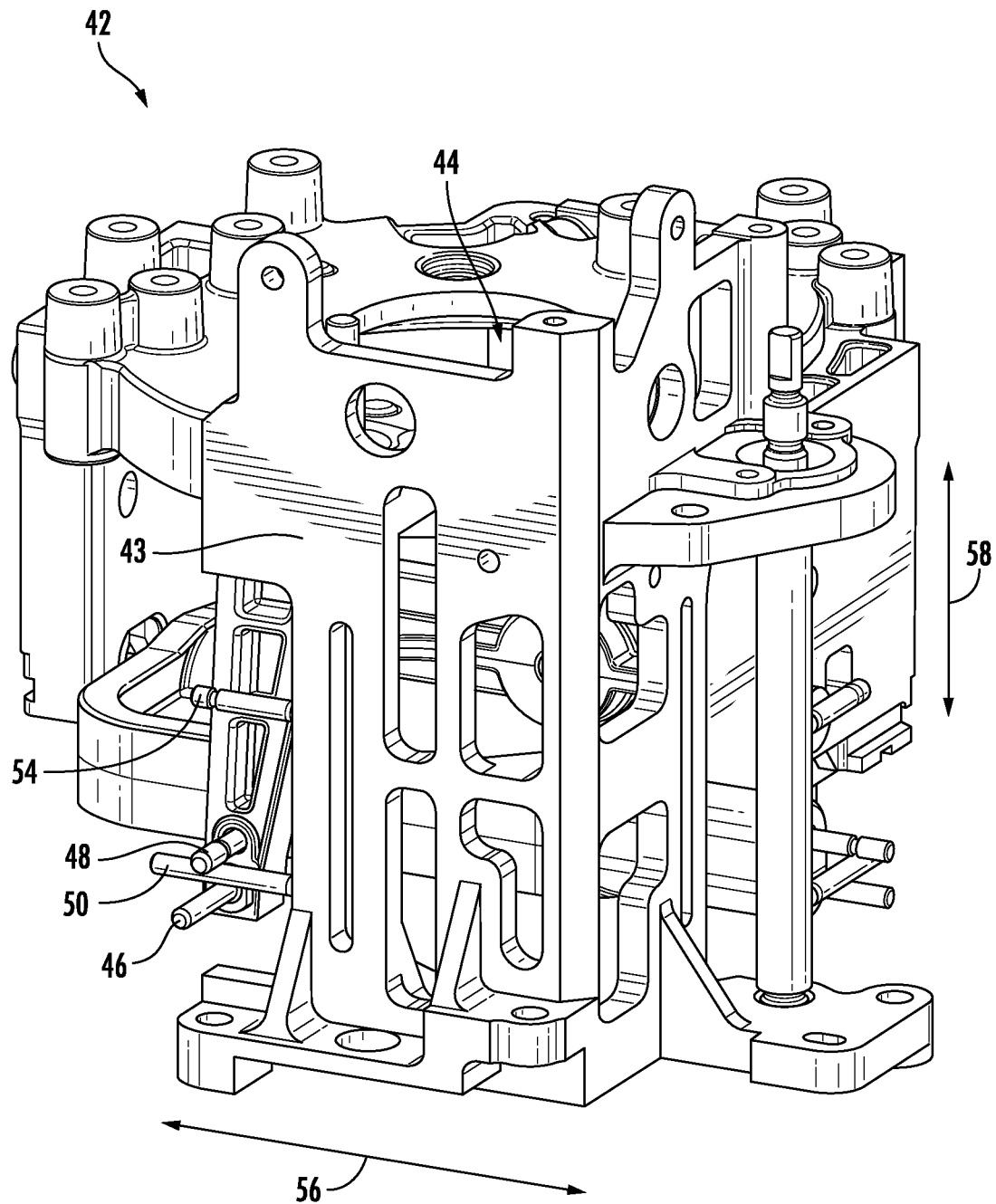
FIG. 3 is a perspective view of the core structure of the laser level of FIG. 1, according to an exemplary embodiment.
Figure 4:
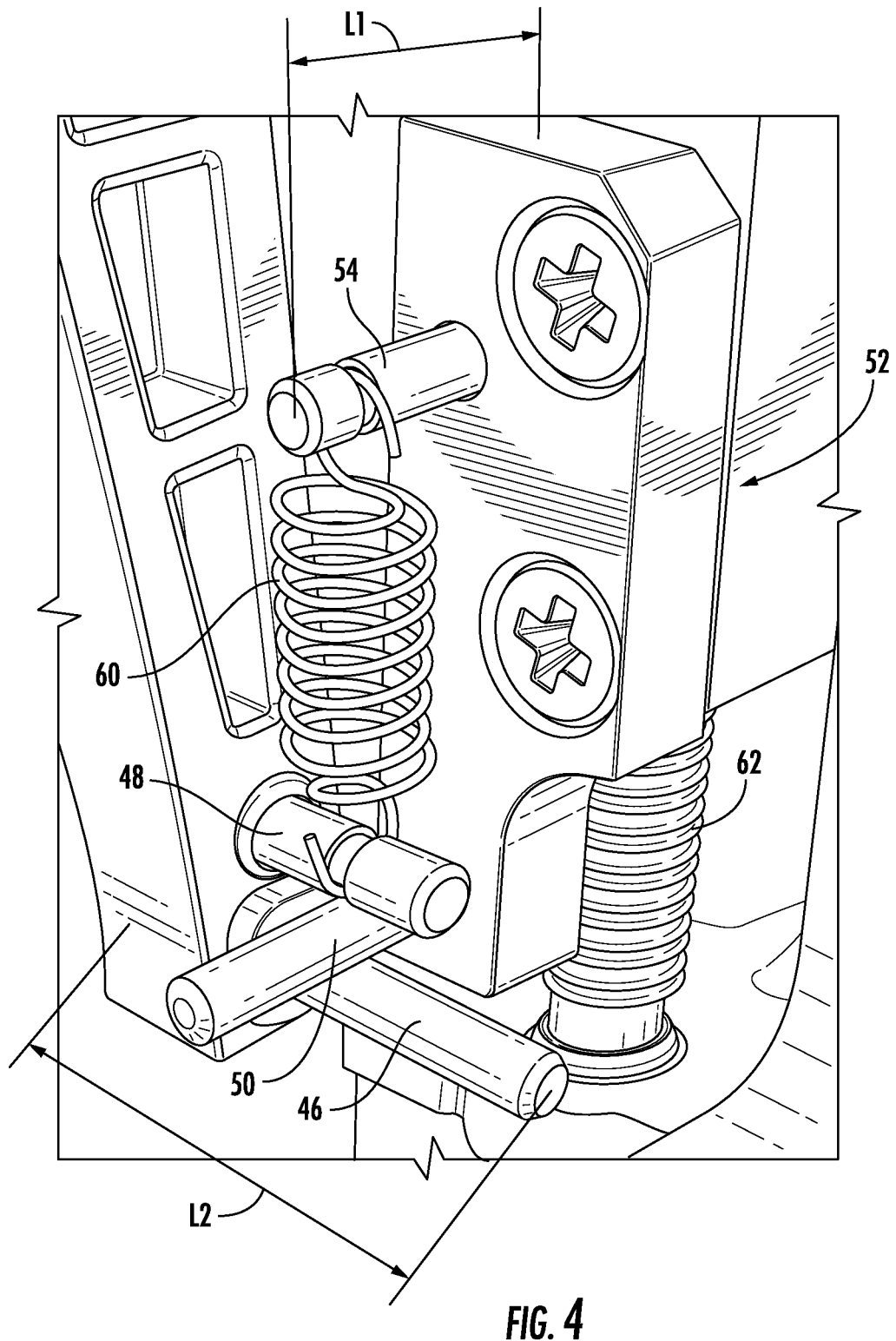
FIG. 4 is a detailed perspective view of a portion of the core structure of FIG. 3, according to an exemplary embodiment.

Referring to FIGS. 3-4, a core structure 42 of rotary laser level 10 is shown, according to an exemplary embodiment. Core structure 42 includes one or more core walls 43 extending along (i.e., generally parallel to) central axis 16. Core structure 42 is positioned within housing 12 and receives at least a portion of laser generator 28 within a cavity 44. In general, core structure 42 includes two sets of leveling pin groups as will be described in greater detail below. The sets of leveling pins allow for leveling in more than one direction. Core structure 42 allows for leveling in a generally horizontal direction, as shown by arrow 56 and in a generally vertical direction, as shown by arrow 58.

Each set of leveling pins includes a first core retaining pin 46 and a second core retaining pin 48 with a motor leveling pin 50 positioned between the first core retaining pin 46 and the second core retaining pin 48. In a specific embodiment, the first core retaining pin 46 has a greater length than the second core retaining pin 48. Motor leveling pin 50 moves up and down (in direction shown by arrow 58) on a leveling block 52 via a threaded rod, shown as a lead screw 62 (see e.g., FIG. 4). Each set of leveling pins further includes a biasing component retaining pin 54. Biasing component retaining pin 54 is coupled to leveling block 52 and configured to hold and/or retain a biasing component or element, shown as spring 60. Biasing component retaining pin 54 is at least partially received within leveling block 52 and includes a total length, L1. Similarly, first core retaining pin 46 is at least partially received within a portion of core structure 42 and includes a total length, L2.

Figure 5:
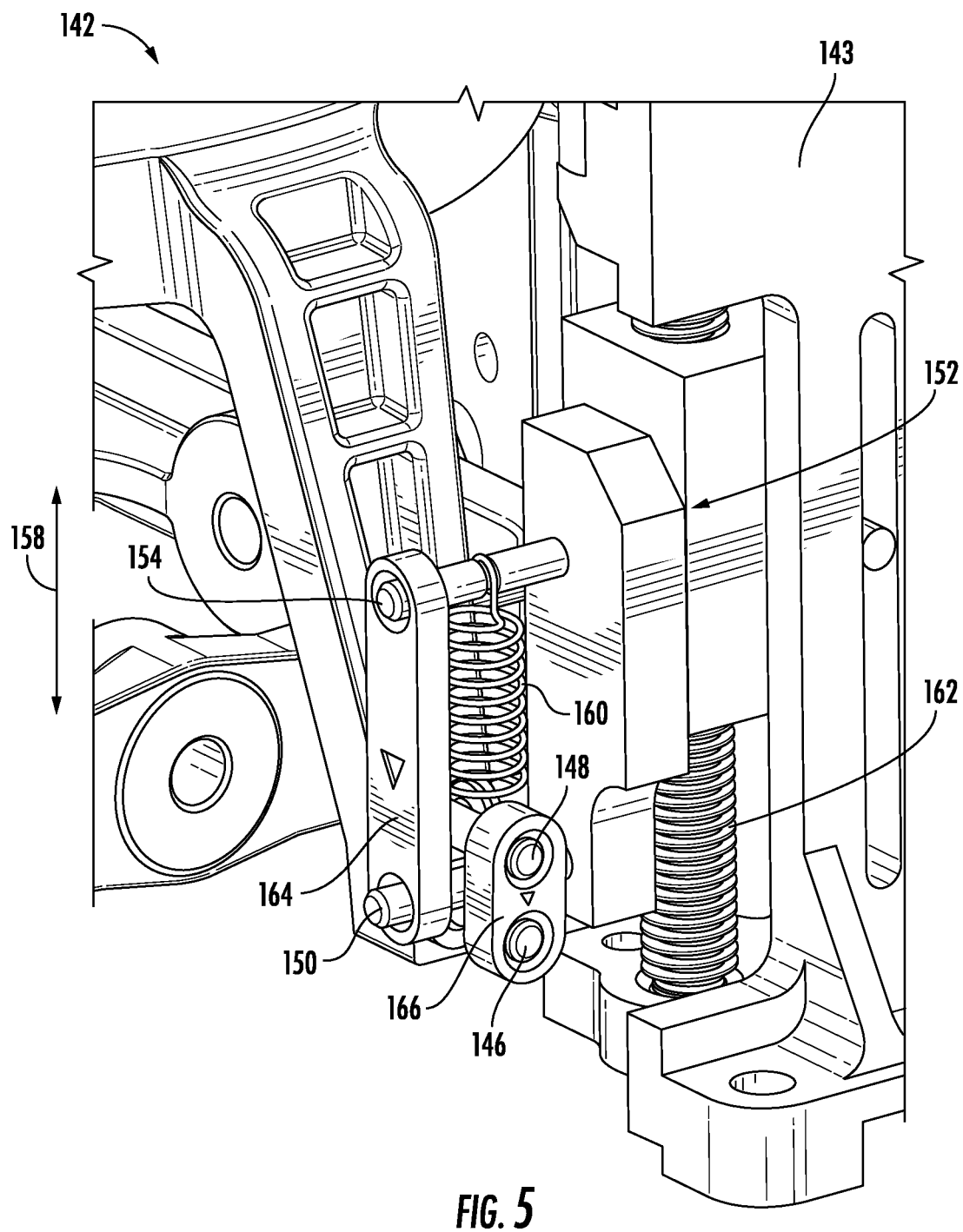
FIG. 5 is a detailed perspective view of a portion of the core structure, according to another exemplary embodiment.
Figure 6:
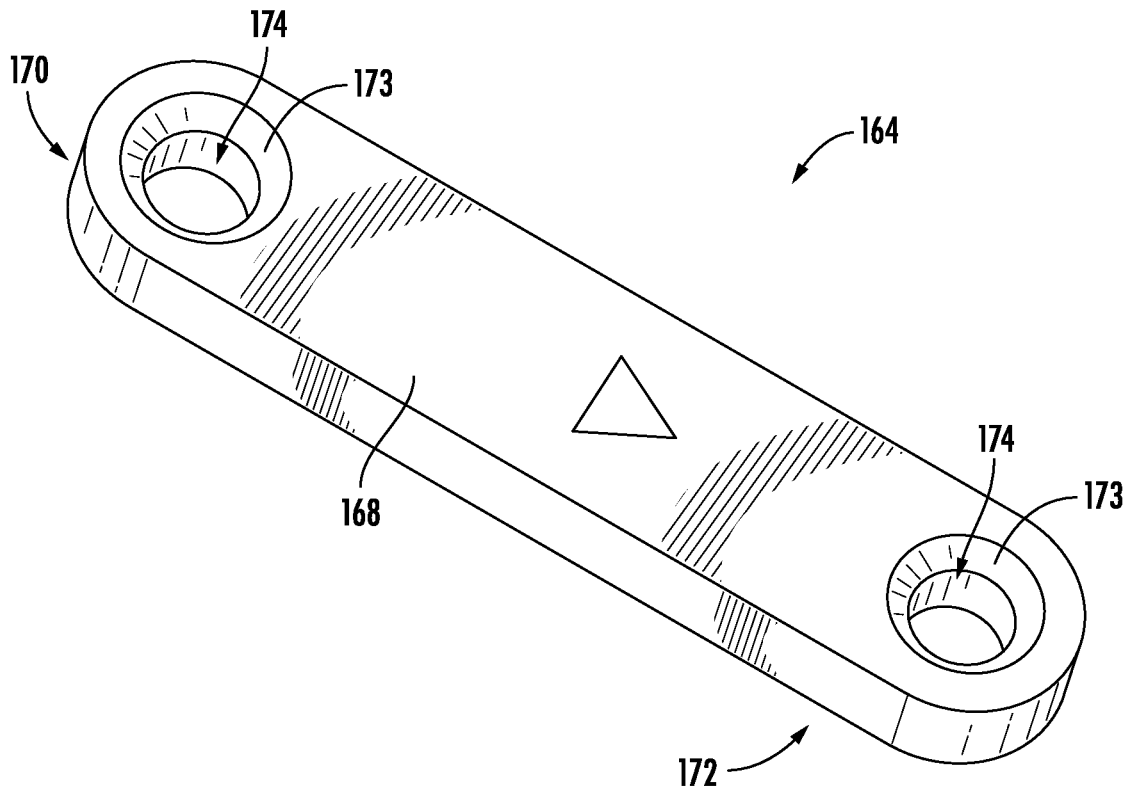
FIG. 6 is a perspective view of a first pin retainer of the core structure of FIG. 5, according to an exemplary embodiment.
Figure 7:
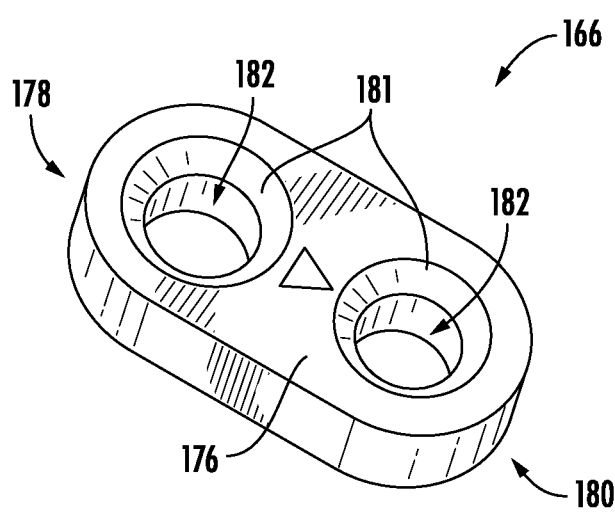
FIG. 7 is a perspective view of a second pin retainer of the core structure of FIG. 5, according to an exemplary embodiment.

Referring to FIGS. 5-7, another embodiment of leveling pins that can be utilized with core structure 42 and/or rotary laser level 10 are shown. Applicant believes the further modifications to the leveling pins increases durability of rotary laser level 10 by reducing the potential force applied to the leveling pin set during an impact event (e.g., drop of rotary laser level 10, impact from falling tool or other worksite debris, etc.). Specifically, Applicant believes use of pin retainers distributes and/or spreads the impact force across more than one leveling pin reducing the likelihood of deformation and/or damage to the leveling pins. In general, core structure 142 is substantially the same as core structure 42 except for the differences discussed herein. Core structure 142 is positioned within the housing (e.g., 12) and a laser generator (e.g., 28) that emits a laser projection is positioned within the core structure 142.

Referring to FIG. 5, a detailed perspective view of a portion of core structure 142 including a set of leveling pins is shown. The set of leveling pins is coupled to the core structure 142 and configured to level the laser generator 28 in a first direction (i.e., generally horizontal direction, see e.g., arrow 56 in FIG. 3) or in a second direction (i.e., generally vertical direction, see e.g., arrow 58 in FIG. 3) that is generally perpendicular (i.e., 90 degrees plus or minus 10 degrees) to the first direction. In various specific embodiments, the first direction is generally perpendicular (i.e., 90 degrees plus or minus 10 degrees) to the direction of gravity on Earth and the second direction acts in the same direction (i.e., parallel to plus or minus 10 degrees) the direction of gravity on Earth.

When there is a second set of leveling pins, a first set of leveling pins level the laser generator 28 in the first direction while the second set of leveling pins level the laser generator 28 in the second direction (i.e., allows for leveling in multiple directions). The second set of leveling pins is the same as the first set of leveling pins except for the differences discussed herein. In other words, the second set of leveling pins includes a third core retaining pin, a fourth core retaining pin, a second biasing component retaining pin, and a second motor leveling pin positioned between the third core retaining pin and the fourth core retaining pin.

The set of leveling pins includes a first core retaining pin 146 and a second core retaining pin 148 with a motor leveling pin 150 positioned between the first core retaining pin 146 and the second core retaining pin 148 in the second direction (i.e., vertically). In a specific embodiment, the first core retaining pin 146 has the same length as the second core retaining pin 148. In various specific embodiments, the first core retaining pin 146 extends from the core structure 142 in a first direction and the second core retaining pin 148 extends from the core structure 142 in a generally parallel (i.e., same orientation plus or minus 10 degrees) orientation to the first core retaining pin 146. In such an embodiment, the biasing component retaining pin 154 extends from the core structure 142 in a second direction, the second direction being generally perpendicular (i.e., 90 degrees plus or minus 10 degrees) from the first direction. Motor leveling pin 150 extends from the core structure 142 in a generally parallel (i.e., same orientation plus or minus 10 degrees) orientation to the biasing component retaining pin 154.

Motor leveling pin 150 moves up and down (in direction shown by arrow 158) on a leveling block 152 via a threaded rod, shown as a lead screw 162. In various embodiments, leveling block 152 is moveable in a motorized manner (i.e., drive by a motor). In other embodiments, leveling block 152 is movable manually. The set of leveling pins further includes a biasing component retaining pin 154. Biasing component retaining pin 154 is coupled to leveling block 152 and configured to hold and/or retain a biasing component, shown as spring 160. Spring 160 is coupled to and extends between biasing component retaining pin 154 and second core retaining pin 148. Biasing component retaining pin 154 is at least partially received within leveling block 152 and includes a total length, L3 (see e.g., FIG. 8).

Figure 9:
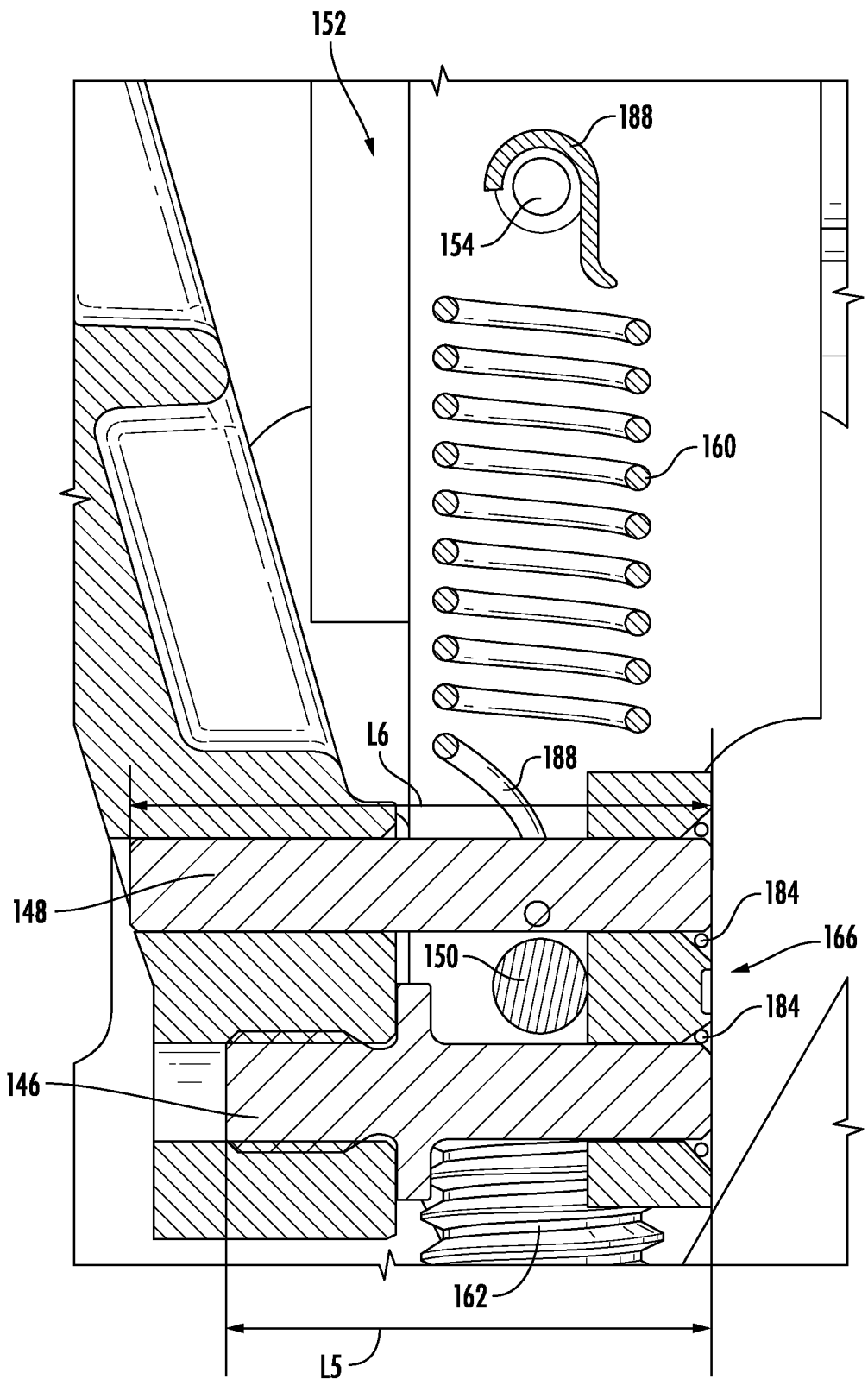
FIG. 9 is a cross-sectional view of the core structure of FIG. 5, according to an exemplary embodiment.

Similarly, first core retaining pin 146 is at least partially received within a portion of core structure 42 and includes a total length, L5 (see e.g., FIG. 9).

A first pin retainer 164 is coupled to and configured to hold biasing component retaining pin 154 and motor leveling pin 150. In other words, first pin retainer 164 is coupled to and extends between biasing component retaining pin 154 and motor leveling pin 150. A second pin retainer 166 is coupled to and configured to hold first core retaining pin 146 to second core retaining pin 148. In other words, second pin retainer 166 is coupled to and extends between first core retaining pin 146 and second core retaining pin 148. When the first core retaining pin 146 has the same length as the second core retaining pin 148, the pin retainers 164, 166 can more easily join and retain biasing component retaining pin 154 to motor leveling pin 150 and first core retaining pin 146 to second core retaining pin 148, respectively.

Referring to FIG. 6, a perspective view of first pin retainer 164 is shown according to an exemplary embodiment. First pin retainer 164 includes a body 168. The body 168 extends between a first end 170 and a second end 172. An opening or bore 174 extends through body 168 at both first end 170 and second end 172 of first pin retainer 164. Each bore 174 is sized to receive biasing component retaining pin 154 and/or motor leveling pin 150 when core structure 142 is assembled. Each bore 174 further includes a beveled portion or angled surface 173 connecting bore 174 to body 168 on a least one side of the bore 174.

Referring to FIG. 7, a perspective view of second pin retainer 166 is shown according to an exemplary embodiment. Second pin retainer 166 includes a body 176. The body 176 extends between a first end 178 and a second end 180. An opening or bore 182 extends through body 176 at both first end 178 and second end 180 of second pin retainer 166. Each bore 182 is sized to receive first core retaining pin 146 and/or second core retaining pin 148 when core structure 142 is assembled. Each bore 182 further includes a beveled portion or angled surface 181 connecting bore 182 to body 176 on a least one side of the bore 182.

Figure 8:
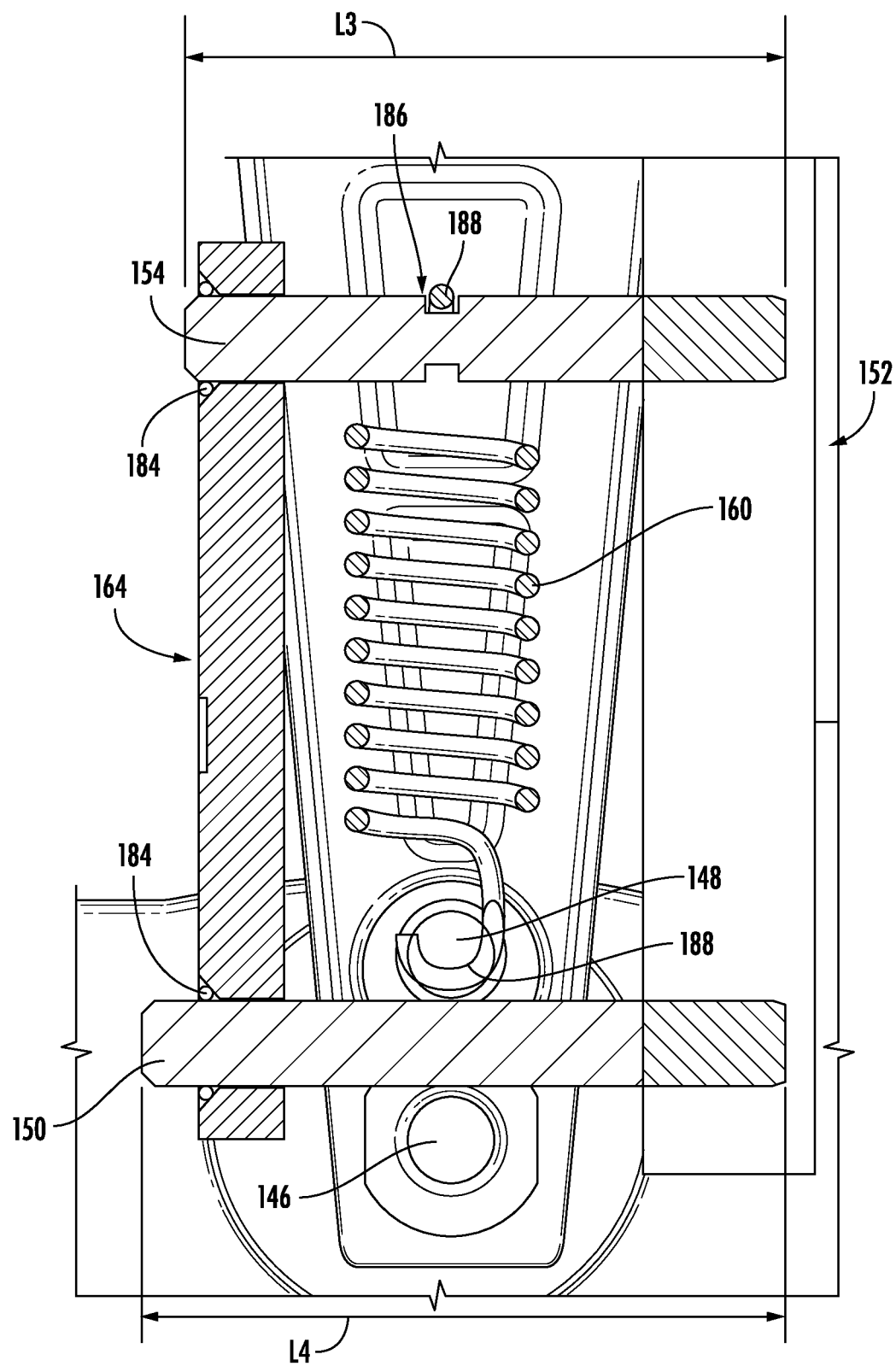
FIG. 8 is a cross-sectional view of the core structure of FIG. 5, according to an exemplary embodiment.

Referring to FIG. 8, a cross-sectional view of a portion of core structure 142 is shown, according to an exemplary embodiment. First pin retainer 164 is slidable onto the ends of biasing component retaining pin 154 and motor leveling pin 150. The angled surface 173 provides a space between first pin retainer 164 and biasing component retaining pin 154. An adhesive 184, shown schematically, is used to fill bore 174 and the space created by angled surface 173 to further secure first pin retainer 164 to biasing component retaining pin 154 and motor leveling pin 150. In other words, adhesive 184 is positioned between at least a portion of first pin retainer 164 and biasing component retaining pin 154 and motor leveling pin 150. Similarly, in various embodiments, an adhesive 184 is positioned between at least a portion of second pin retainer 166 and first core retaining pin 146 and second core retaining pin 148. Spring 160 includes a connecting arm 188 on each end to grasp biasing component retaining pin 154 and second core retaining pin 148. In a specific embodiment, biasing component retaining pin 154 and/or second core retaining pin 148 include a channel 186 configured to receive a connecting arm 188 of spring 160.

Motor leveling pin 150 includes a total length, L4. In a specific embodiment L4 is greater than L3, the length of biasing component retaining pin 154. In another specific embodiment, L3 (length of biasing component retaining pin 154) is a similar length to L4 (e.g., same length±0.025 inches). In such an embodiment, Applicant believes the first pin retainer 164 can more easily join and/or retain the biasing component retaining pin 154 and the motor leveling pin 150 than an embodiment where the biasing component retaining pin 154 and motor leveling pin 150 have significantly different (see e.g., FIG. 4 pin 54 comparison to pin 50) lengths.

As noted above, Applicant has determined that utilization of pin retainers and providing the specific dimensions of the leveling pins allows for an improved impact performance and increased durability of the core (i.e., improve maintenance of accuracy after impact) while providing for an easier joining of the leveling pins. Specifically, Applicant believes use of pin retainers distributes and/or spreads the impact force across more than one leveling pin. For example, when the first pin retainer 164 couples biasing component retaining pin 154 to motor leveling pin 150, an impact force experienced by biasing component retaining pin 154 and/or motor leveling pin 150 can be distributed or spread across the length and/or area of more than a singular leveling pin.

In other words, when an impact force is applied to rotary laser level 10 and more specifically core structure 142, the first pin retainer 164 distributes or spreads the impact force between the biasing component retaining pin 154 and the motor leveling pin 150. Similarly, when an impact force is applied to rotary laser level 10 and more specifically core structure 142, the second pin retainer 166 distributes or spreads the impact force between the first core retaining pin 146 and the second core retaining pin 148. Use of the first pin retainer 164 and/or second pin retainer 166 spreads the impact force between the biasing component retaining pin 154 and the motor leveling pin 150 or the first core retaining pin 146 and the second core retaining pin 148 such that deformation of the biasing component retaining pin 154 and the motor leveling pin 150 or the deformation of the first core retaining pin 146 and the second core retaining pin 148 caused by the impact force is reduced. Therefore, when first pin retainer 164 and second pin retainer 166 are used with rotary laser level 10, the first pin retainer 164 distributes a force (such as an impact force) on or applied to the core structure 142 between biasing component retaining pin 154 and the motor leveling pin 150 and the second pin retainer 166 distributes the force on the core structure 142 between the first core retaining pin 146 and the second core retaining pin 148.

Referring to FIG. 9, a cross-sectional view of a portion of core structure 142 is shown, according to an exemplary embodiment. Second pin retainer 166 is slidable onto the ends of first core retaining pin 146 to second core retaining pin 148. The angled surface 181 provides a space between second pin retainer 166 and first core retaining pin 146 and second core retaining pin 148. Adhesive 184, shown schematically, is used to fill bore 182 and the space created by angled surface 181 to further secure second pin retainer 166 to first core retaining pin 146 to second core retaining pin 148.

The total length, L5, of first core retaining pin 146 is less than total length L2 of first core retaining pin 46. The total length, L1, of biasing component retaining pin 54 is less than the total length L3 of biasing component retaining pin 154. Applicant has found the use of a pin retainer such as first pin retainer 164 and second pin retainer 166 reduces the force applied to the leveling pin set (i.e., biasing component retaining pin 154, motor leveling pin 150, first core retaining pin 146, and second core retaining pin 148). In a specific embodiment, Applicant has found the deformation on an individual leveling pin can be reduced by greater than 50%, specifically between 70% to 80%, and more specifically about 74% (e.g., 74%±2%). In various specific embodiments, the deformation of biasing component retaining pin 154 and motor leveling pin 150 caused by the impact force is reduced by greater than 50%, and more specifically reduced by between 70% and 80%.

In various specific embodiments, with an impact force, the deformation is less than a maximum deformation. In various specific embodiments, the force experienced by each leveling pin is less than a maximum force. In various specific embodiments a force on the biasing component retaining pin 154 and the motor leveling pin 150 under an impact force tested under a drop test is less than a maximum force. In various specific embodiments, a force on the first core retaining pin 146 and the second core retaining pin 148 under an impact force tested under a drop test is less than a maximum force.

In a specific embodiment, first core retaining pin 146 extends about the same length (e.g., same length±0.025 inches) beyond (i.e., distance in direction away from, perpendicular to core walls 143) the core structure 142 as the second core retaining pin 148. In a specific embodiment, the first core retaining pin 146 extends a first distance from the core wall 143 of core structure 142 and the second core retaining pin 148 extends a second distance from the core wall 143 and the first distance is the same as the second distance. In such an embodiment, Applicant believes the second pin retainer 166 can more easily join and/or retain the first core retaining pin 146 and second core retaining pin 148 than an embodiment where the first core retaining pin 146 and second core retaining pin. Second core retaining pin includes a total length, L6. In a specific embodiment L6 is greater than L5.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A laser level comprising:
   a housing;
   a core structure positioned within the housing;
   a laser generator positioned within the cores structure configured to emit a laser;
   a set of leveling pins coupled to the core structure and configured to level the laser generator in a first direction, the set of leveling pins comprising:
   a first core retaining pin;
   a second core retaining pin;
   a biasing component retaining pin; and
   a motor leveling pin positioned between the first core retaining pin and the second core retaining pin;
   a biasing component coupled to and extending between the biasing component retaining pin and the second core retaining pin;
   a first pin retainer coupled to and extending between the biasing component retaining pin and the motor leveling pin; and
   a second pin retainer coupled to and extending between the first core retaining pin and the second core retaining pin.

2. The laser level of claim 1, wherein, when an impact force is applied to the laser level, the first pin retainer distributes the impact force between the biasing component retaining pin and the motor leveling pin.

3. The laser level of claim 1, wherein, when an impact force is applied to the laser level, the second pin retainer distributes the impact force between the first core retaining pin and the second core retaining pin.

4. The laser level of claim 1, further comprising a second set of leveling pins, the second set of leveling pins configured to level the laser generator in a second direction that is generally perpendicular to the first direction.

5. The laser level of claim 4, the second set of leveling pins comprising:
a third core retaining pin;
a fourth core retaining pin;
a second biasing component retaining pin; and
a second motor leveling pin positioned between the third core retaining pin and the fourth core retaining pin.

6. The laser level of claim 5, further comprising:
a second biasing component coupled to and extending between the second biasing component retaining pin and the fourth core retaining pin;
a third pin retainer coupled to and extending between the second biasing component retaining pin and the second motor leveling pin; and
a fourth pin retainer coupled to and extending between the third core retaining pin and the fourth core retaining pin.

7. The laser level of claim 6, wherein, when an impact force is applied to the laser level, the third pin retainer distributes the impact force between the second biasing component retaining pin and the second motor leveling pin.

8. The laser level of claim 6, wherein, when an impact force is applied to the laser level, the fourth pin retainer distributes the impact force between the third core retaining pin and the fourth core retaining pin.

9. A laser generating device comprising:
a housing;
a core structure positioned within the housing;
a laser generator positioned within the core structure and configured to emit a laser;
a set of leveling pins coupled to the core structure and configured to level the laser generator, the set of leveling pins comprising:
a first core retaining pin;
a second core retaining pin;
a biasing component retaining pin; and
a motor leveling pin positioned between the first core retaining pin and the second core retaining pin; and
a pin retainer coupled to and extending between the biasing component retaining pin and the motor leveling pin;
wherein, when an impact force is applied to the core structure, the pin retainer spreads the impact force between the biasing component retaining pin and the motor leveling pin.

10. The laser generating device of claim 9, further comprising a second pin retainer coupled to and extending between the first core retaining pin and the second core retaining pin.

11. The laser generating device of claim 10, wherein, when the impact force is applied to the core structure, the second pin retainer spreads the impact force between the first core retaining pin and the second core retaining pin such that deformation of the first core retaining pin and the second core retaining pin caused by the impact force is reduced.

12. The laser generating device of claim 10, further comprising an adhesive positioned along the second pin retainer such that the second pin retainer is secured to the first core retaining pin and the second core retaining pin.

13. The laser generating device of claim 9, the pin retainer further comprising:
a body comprising:
a first end; and
a second end opposing the first end;
a first bore extending through the body at the first end; and
a second bore extending through the body at the second end;
wherein the first bore and the second bore are sized to receive the biasing component retaining pin and the motor leveling pin respectively.

14. The laser generating device of claim 13, the pin retainer further comprising a first angled surface connecting the first bore to the body on a least one side of the first bore and a second angled surface connecting the second bore to the body on at least one side of the second bore.

15. The laser generating device of claim 14, further comprising an adhesive positioned along the first angled surface and the second angled surface such that the pin retainer is secured to the biasing component retaining pin and the motor leveling pin.

16. A laser level comprising:
a housing;
a core structure positioned within the housing;
a laser generator positioned within the cores structure and configured to emit a laser;
a set of leveling pins coupled to the core structure and configured to level the laser generator, the set of leveling pins comprising:
a first core retaining pin extending from the core structure in a first direction;
a second core retaining pin extending from the core structure in a generally parallel orientation to the first core retaining pin;
a biasing component retaining pin extending from the core structure in a second direction, the second direction perpendicular to the first direction; and
a motor leveling pin extending from the core structure in a generally parallel orientation to the biasing component retaining pin and positioned between the first core retaining pin and the second core retaining pin;
a biasing component coupled to the biasing component retaining pin and the second core retaining pin;
a first pin retainer coupled to and extending between the biasing component retaining pin and the motor leveling pin; and
a second pin retainer coupled to and extending between the first core retaining pin and the second core retaining pin;
wherein the first pin retainer distributes a force on the core structure between the biasing component retaining pin and the motor leveling pin, and the second pin retainer distributes the force on core structure between the first core retaining pin and the second core retaining pin.

17. The laser level of claim 16, wherein the first core retaining pin has a first length and the second core retaining pin has a second length.

18. The laser level of claim 17, wherein the second length is the same as the first length.

19. The laser level of claim 16, wherein the first core retaining pin and the second core retaining pin are at least partially received within a wall of the core structure.

20. The laser level of claim 19, wherein the first core retaining pin extends a first distance from the wall of the core structure and the second core retaining pin extends a second distance from the wall of the core structure, and wherein the first distance is the same as the second distance.

* * * * *